US010216080B2

(12) United States Patent
Kim et al.

(10) Patent No.: US 10,216,080 B2
(45) Date of Patent: *Feb. 26, 2019

(54) MULTI-PROJECTION SYSTEM

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,320

(22) Filed: Mar. 18, 2014

(65) Prior Publication Data

US 2014/0354963 A1 Dec. 4, 2014

(30) Foreign Application Priority Data

May 31, 2013 (KR) .................. 10-2013-0062914

(51) Int. Cl.
*G03B 21/26* (2006.01)
*H04N 9/31* (2006.01)
(Continued)

(52) U.S. Cl.
CPC ................ *G03B 31/00* (2013.01); *A47C 1/12* (2013.01); *A47C 3/18* (2013.01); *A63J 25/00* (2013.01); *E04H 3/22* (2013.01); *G02B 27/2271* (2013.01); *G03B 21/003* (2013.01); *G03B 21/14* (2013.01); *G03B 21/16* (2013.01); *G03B 21/206* (2013.01); *G03B 21/2053* (2013.01); *G03B 21/26* (2013.01); *G03B 21/56* (2013.01); *G03B 21/60* (2013.01); *G03B 21/608* (2013.01);
(Continued)

(58) Field of Classification Search
CPC .. G03B 21/003; G03B 21/005; G03B 21/006; G03B 21/00; G03B 21/008; G03B 21/13; H04N 9/3147
USPC ............. 353/30, 31, 7, 121, 122; 352/69, 70
See application file for complete search history.

(56) References Cited

U.S. PATENT DOCUMENTS 4,962,420 A    10/1990   Judenich
5,602,978 A *   2/1997   Lastinger ................ G06T 15/10
                                                                                                 345/419

(Continued)

FOREIGN PATENT DOCUMENTS

CN         2893744 Y     4/2007
CN     101290467 A   10/2008
(Continued)

OTHER PUBLICATIONS

Korean Office Action for application No. 10-2013-0062914 dated Aug. 18, 2014.
(Continued)

*Primary Examiner* — Ryan D Howard
(74) *Attorney, Agent, or Firm* — Hauptman Ham, LLP

(57) ABSTRACT

The present invention provides a multi-projection system including a plurality of projection surfaces, on which images are projected, which are arranged to surround an auditorium, and the plurality of projection surfaces comprise different types of projection surfaces. According to the present invention, it is possible to provide an audience with an image with high three-dimensional effect and immersion and provide images of multiple viewpoints such that the audience can feel as if they are in a space created by the images.

3 Claims, 7 Drawing Sheets

(51) Int. Cl.

| | | |
|---|---|---|
| G03B 31/00 | (2006.01) | |
| H04N 21/41 | (2011.01) | |
| H04N 5/445 | (2011.01) | |
| E04H 3/22 | (2006.01) | |
| G03B 21/56 | (2006.01) | |
| G02B 27/22 | (2018.01) | |
| G03B 21/608 | (2014.01) | |
| G03B 21/14 | (2006.01) | |
| A47C 1/12 | (2006.01) | |
| A47C 3/18 | (2006.01) | |
| A63J 25/00 | (2009.01) | |
| G03B 29/00 | (2006.01) | |
| G03B 41/00 | (2006.01) | |
| G03B 21/00 | (2006.01) | |
| G03B 21/20 | (2006.01) | |
| G03B 21/60 | (2014.01) | |
| G03B 21/16 | (2006.01) | |
| A63J 5/00 | (2006.01) | |
| G03B 37/04 | (2006.01) | |

(52) U.S. Cl.
CPC ............ *G03B 29/00* (2013.01); *G03B 41/00* (2013.01); *H04N 5/44591* (2013.01); *H04N 9/3147* (2013.01); *H04N 9/3182* (2013.01); *H04N 9/3185* (2013.01); *H04N 9/3194* (2013.01); *H04N 21/4122* (2013.01); *A63J 2005/002* (2013.01); *G03B 37/04* (2013.01)

(56) References Cited

U.S. PATENT DOCUMENTS

| | | | | |
|---|---|---|---|---|
| 5,963,247 | A * | 10/1999 | Banitt | G02B 27/2228 348/121 |
| 5,964,064 | A * | 10/1999 | Goddard | A63J 5/021 352/43 |
| 6,665,985 | B1 | 12/2003 | Hennes | |
| 6,764,183 | B2 * | 7/2004 | Okazaki | B82Y 20/00 348/E9.026 |
| 8,714,746 | B2 * | 5/2014 | Choi | E04H 3/22 352/70 |
| 2002/0105623 | A1 * | 8/2002 | Pinhanez | G03B 21/28 353/69 |
| 2003/0006091 | A1 * | 1/2003 | Golterman | E04B 1/86 181/292 |
| 2003/0098957 | A1 | 5/2003 | Haldiman | |
| 2004/0169827 | A1 | 9/2004 | Kubo et al. | |
| 2005/0052623 | A1 * | 3/2005 | Hsiung | G03B 21/14 353/94 |
| 2005/0128437 | A1 * | 6/2005 | Pingali | G03B 21/14 353/69 |
| 2008/0088807 | A1 * | 4/2008 | Moon | G03B 21/14 353/121 |
| 2008/0095468 | A1 * | 4/2008 | Klemmer | H04N 9/3194 382/285 |
| 2009/0310100 | A1 | 12/2009 | Kondo | |
| 2009/0323029 | A1 | 12/2009 | Chen et al. | |
| 2014/0016041 | A1 * | 1/2014 | Kim | G03B 21/53 348/745 |
| 2014/0016099 | A1 * | 1/2014 | Choi | E04H 3/22 353/30 |
| 2014/0016100 | A1 * | 1/2014 | Kim | G03B 37/04 353/30 |
| 2014/0204343 | A1 * | 7/2014 | Choi | E04H 3/22 353/10 |

FOREIGN PATENT DOCUMENTS

| | | |
|---|---|---|
| CN | 202036810 U | 11/2011 |
| CN | 103995429 A | 8/2014 |
| EP | 2685313 A1 | 1/2014 |
| JP | 03-505691 A | 12/1991 |
| JP | 11064975 A | 3/1999 |
| JP | 2002-070211 A | 3/2002 |
| JP | 2003-323610 A | 11/2003 |
| JP | 2003333611 A | 11/2003 |
| JP | 2004-62025 A | 2/2004 |
| JP | 2004-228948 A | 8/2004 |
| JP | 2004-246233 A | 9/2004 |
| JP | 2005-277900 A | 10/2005 |
| JP | 2007178582 A | 7/2007 |
| JP | 2008-175960 A | 7/2008 |
| JP | 2009-521005 A | 5/2009 |
| JP | 2010055042 A | 3/2010 |
| JP | 2011-250034 A | 12/2011 |
| JP | 2012-255986 A | 12/2012 |
| KR | 1019980087553 A | 12/1998 |
| KR | 1020020003916 A | 1/2002 |
| KR | 1020060087597 A | 8/2006 |

OTHER PUBLICATIONS

Written Opinion of the International Searching Authority for application No. PCT/KR2013/012309 dated Apr. 16, 2014.
International Search Report for application No. PCT/KR2013/012309 dated Apr. 16, 2014.
Supplementary European Search Report and Written Opinion of the International Searching Authority for application No. EP 13885520.0 dated Dec. 9, 2016.
Japanese Office Action dated Dec. 20, 2016 in connection with the counterpart Japanese Patent Application No. 2016-516435.
Chinese Office Action dated Jan. 19, 2017 in connection with the counterpart Chinese Patent Application No. 201380075273.6.
Kazuko Sato, "Laser video projector "ProFX" New generation image directpr . . . Unevenness, curved surface, perfect focus anywhere", Video information Industrial (until 2000), 1995, p. 31-p. 36, vol. 27, 1995, Japan.
Japanese Office Action dated Jul. 3, 2018 for corresponding Japanese Application No. 2016-516435.

* cited by examiner

MULTI-PROJECTION SYSTEM

CROSS REFERENCE TO RELATED APPLICATION

This application claims the priority of Korean Patent Application No. 10-2013-0062914, filed on May 31, 2013 in the KIPO (Korean Intellectual Property Office).

TECHNICAL FIELD

The present invention relates to a multi-projection system which reproduces images by projection and, more particularly, to a multi-projection system in which a plurality of projection surfaces are arranged three-dimensionally in a theater to project an image to each of the projection surfaces arranged three-dimensionally, thus providing an audience with three-dimensional images.

BACKGROUND ART

Conventionally, in order to reproduce images such as movies, advertisements, etc., a two-dimensional image is projected on a flat screen arranged in front of a theater.

FIG. 1 shows an example in which an image is reproduced in a conventional theater system in such a manner that a projector located at the rear of a theater projects the image on a screen installed in front of the theater, and thus an audience can only watch two-dimensional (2D) images.

Research on technologies for providing the audience with three-dimensional (3D) images has recently been conducted, and 3D image technologies such as 3D TVs, 3D theaters, etc. have been developed. 3D image technologies use the principle of allowing the audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, while these 3D technologies can provide the audience with 3D images, the audience just watches the images reproduced on a flat screen, which may reduce the degree of involvement in the images.

Meanwhile, IMAX movies have been developed to provide the audience with an image with a high degree of involvement. The IMAX is an abbreviation for eye maximum and means that the limited field of view of the human eye is covered with the image. The screen is tilted about 5 degrees toward the audience to provide a realistic image, and 70 mm film that has a resolution ten times that of existing 35 mm move film is used to provide a clear and very large image, thus allowing the audience to be involved in the image.

However, the conventional methods for increasing the involvement of the audience in the image, such as 3D technologies or IMAX technologies, have the limitation that the screen is a two-dimensional plane. Thus, the degree of involvement of the audience in the image or the degree of three-dimensional effect that the audience feels from the image is limited.

DISCLOSURE OF INVENTION

Technical Problem

The present invention has been made in an effort to solve the above problems associated with the prior art, and an object of the present invention is to provide a multi-projection system which can provide an audience with a three-dimensional image by reproducing images on a plurality of projection surfaces arranged three-dimensionally.

Another object of the present invention is to provide a multi-projection system which can increase the involvement of the audience in an image by reproducing the image using various surfaces in a theater, such as the font, left, right, upper, and lower sides.

In particular, an object of the present invention is to provide a multi-projection system which corrects images depending on the types of surfaces on which the images are projected, thus increasing the involvement of the audience in the images even when the images are reproduced on different types of projection surfaces.

Solution to Problem

To achieve the above object, a multi-projection system in accordance with an embodiment of the present invention may comprise a plurality of projection surfaces, on which images are projected, which are arranged to surround an auditorium, and the plurality of projection surfaces may comprise different types of projection surfaces.

Here, the projection surface may be formed with a screen, an interior surface of a theater, or a surface of an internal fixture of the theater.

The plurality of projection surfaces may comprise different types of screens.

The plurality of projection surfaces may comprise different types of interior surfaces of the theater.

The plurality of projection surfaces may comprise different types of surfaces of internal fixtures of the theater.

The plurality of projection surfaces may comprise both the projection surface formed with the screen and the projection surface formed with the interior surface of the theater.

The plurality of projection surfaces may comprise a screen arranged in front of the theater and walls arranged on the left and right sides of the screen.

The plurality of projection surfaces may further comprise a ceiling or floor.

The plurality of projection surfaces may comprise both the projection surface formed with the screen and the projection surface formed with the surface of the internal fixture of the theater.

The plurality of projection surfaces may further comprise a projection surface formed with a ceiling or floor.

The interior surface of the theater or the surface of the internal fixture of the theater may comprise an optical paint for optical reflection applied thereon.

When the types of the projection surfaces are different, the image projected on each projection surfaces may be corrected based on the type of each projection surface.

The correction may be made based on the color, material, or type of the projection surface.

The correction may be made based on the distance between a projection surface and a projection or based on the angle at which the image is projected.

The interior surface of the theater may comprise a sound absorbing material.

The sound absorbing material may comprise at least one selected from the group consisting of a porous molded sound absorbing material, a plate vibration-type sound absorbing material, and a resonance-type sound absorbing material.

The plurality of projection surfaces may be arranged on at least two sides that are not parallel to each other, and the number of projection surfaces arranged on a specific side may be at least one.

The plurality of projection surfaces may comprise both the projection surface formed with the interior surface of the theater and the projection surface formed with the surface of the internal fixture of the theater.

Advantageous Effects of Invention

The present invention can reproduce images on a plurality of projection surfaces which are arranged three-dimensionally, thus providing an audience with an image with high three-dimensional effect and immersion.

Moreover, the present invention can provide images of multiple viewpoints such that the audience can feel as if they are in a space created by the images.

Meanwhile, the present invention can reproduce images using various types of projection surfaces and correct the images based on differences in the types of projection surfaces, thus providing the audience with images of the same quality, regardless of the type of the projection surface.

MODE FOR THE INVENTION

Hereinafter, the present invention will be described in detail with reference to the accompanying drawings.

Figure 2:
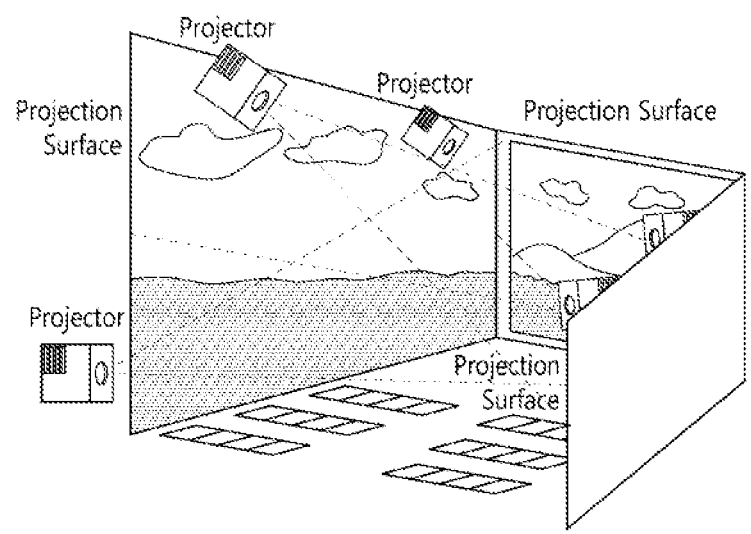
FIG. 2 is a perspective view showing a multi-projection system in accordance with an embodiment of the present invention.

FIG. 2 is a perspective view showing a multi-projection system in accordance with an embodiment of the present invention.

In the multi-projection system of the present invention, a plurality of projection surfaces may be arranged on two or more surfaces which are not in parallel. Moreover, in the multi-projection system of the present invention, the plurality of projection surfaces are arranged to surround an auditorium.

According to the prior art, an image is projected only on a screen placed in front of a theater such that an audience watches the image reproduced on the two-dimensional screen or a 3D technology is applied to the image itself reproduced on a plane. On the contrary, according to the present invention, images are reproduced on a plurality of projection surfaces, which are arranged three-dimensionally so as not to be parallel to each other, and thus it is possible to provide the audience with a three-dimensional image with high 3D effect and involvement through the three-dimensionally arranged projection surfaces without applying the 3D technology to the image itself.

The present invention reproduces the images on the plurality of projection surfaces, and thus the audience can feel as if they are in a space created by the images. The images are reproduced in all spaces within the field of view of the audience, and thus the audience can view the images reproduced three-dimensionally, just as the reality.

That is, the present invention provides the three-dimensional effect in a manner that is quite different from the conventional methods such as IMAX that increases the degree of involvement only by increasing the size of the screen without overcoming the limitations of the two-dimensional plane. That is, the images are reproduced on all surfaces that can be visually recognized by the audience, such as the front, left, right, upper, and lower sides, and thus the audience can feel as if they are in a space created by the images. Therefore, the audience recognizes the multi-projection system of the present invention itself as a virtual reality, and the involvement of the audience in the images is significantly increased, compared to the prior art.

The present invention may divide a single image into a plurality of images and project them on the respective projection surfaces such that the images projected on the plurality of projection surfaces are combined and recognized as a single image. Moreover, in another embodiment, a main image may be reproduced on a front projection surface and another image that creates a special effect may be reproduced on a side projection surface such that different images are projected on the respective projection surfaces, thus providing the audience with the three-dimensional effect.

In the present invention, the angle between the projection surfaces is not limited to a specific angle, and the plurality of projection surfaces may be arranged at various angles as long as the audience can feel the three-dimensional effect. Moreover, the number of projection surfaces, the projection method, the angle between the projection surfaces, etc., which are not particularly limited, may vary depending on the shape of the theater in which the multi-projection system of the present invention is provided.

Meanwhile, the plurality of projection surfaces may be arranged in the front, left side, and right side in the multi-projection system in accordance with an embodiment of the present invention.

Figure 3:
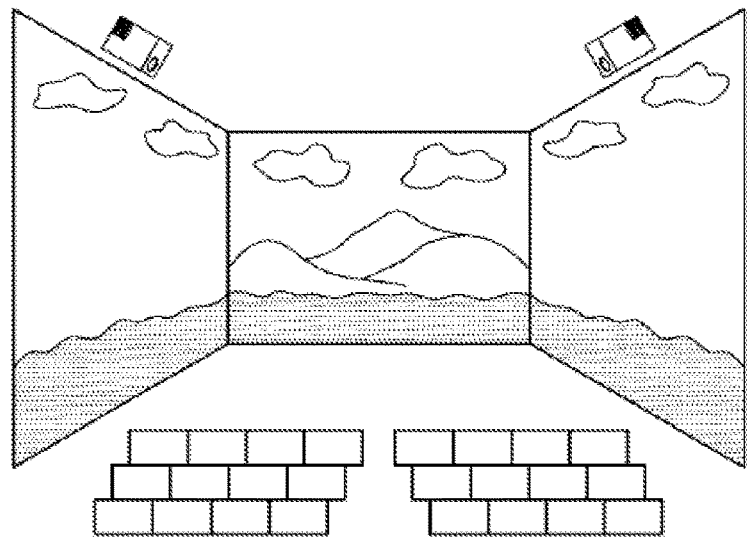
FIG. 3 is a front view showing a multi-projection system in accordance with an embodiment of the present invention.

FIG. 3 is a front view showing a multi-projection system in accordance with an embodiment of the present invention. In this embodiment shown in FIG. 3, the projection surfaces are arranged on the front, left side, and right side, and a projector for projecting an image on each projection surface is provided. Here, one or more projectors for projecting an image on each projection surface are provided, and the images projected on the projection surfaces by the projectors generally create a single image, thus increasing the involvement of the audience in the image.

The projector may be installed on any side of the theater, but may preferably be installed to face the surface on which the image is projected. In another embodiment, the projector may be installed on the ceiling of the theater and then a mirror may be mounted on the front of the projector such that the image can be projected on the corresponding projection surface by adjusting the angle of the mirror. The method of arranging the projectors is not limited to the embodiments described in the specification and includes various methods that can reproduce the images projected by the projectors on the projection surfaces.

The unique features of the present invention will be described more clearly by comparing FIGS. 1 and 3.

Figure 1:
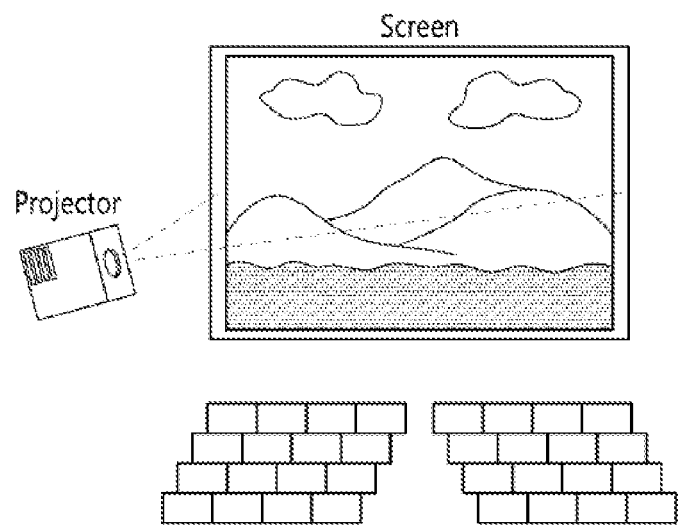
FIG. 1 is a diagram showing an example of a conventional theater system which reproduces an image.

Images reproduced on the projection surfaces of FIGS. 1 and 3 are taken at a viewpoint to the land from the sea. The audience can recognize from the images that they are on the sea and looking at the land.

In FIG. 1, the angle looking at the land from the sea is fixed to the front. That is, the point of view of the audience is fixed. However, in the actual reality, there is land, sea, or sky on the upper, lower, left, and right sides, which are not visible on the screen, and there are also many viewpoints depending on the angle. In an example of the prior art shown in FIG. 1, the image is reproduced on a single screen, and thus the point of view of the audience is fixed to the two-dimensional plane, which makes it impossible to properly reflect the actual reality that is configured three-dimensionally.

However, according to the present invention shown in FIG. 3, the audience can enjoy the images from various viewpoints at the same time. That is, the audience can enjoy the images from a viewpoint to the front land, from a viewpoint to the left sea, and from a viewpoint to the right sea at the same time. In other words, the multi-projection system of the present invention provides the same viewpoint as the three-dimensional reality and thus allows the audience to feel as if they are currently looking at the reality, composed of land and sea, on the sea. That is, the present invention can provide three-dimensional effect and immersion that are different from those of the prior art.

According to the multi-projection system in accordance with an embodiment of the present invention, the projection surfaces may be further arranged on the upper or lower side or on both the upper and lower sides.

Figure 4:
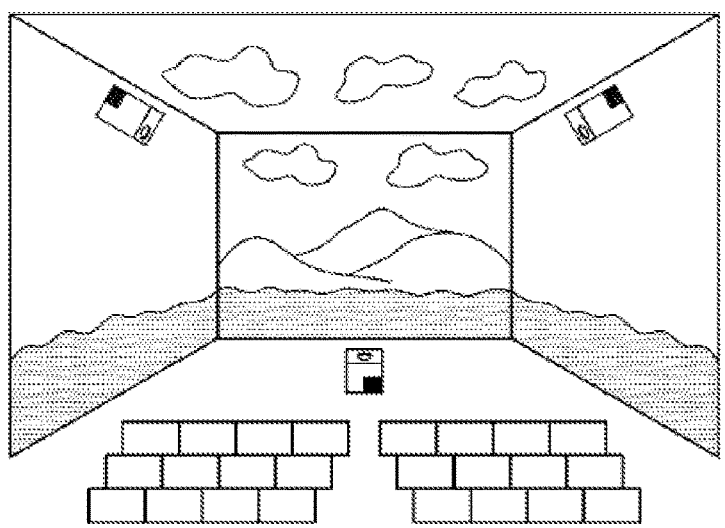
FIG. 4 is a front view showing a multi-projection system in accordance with another embodiment of the present invention.
Figure 5:
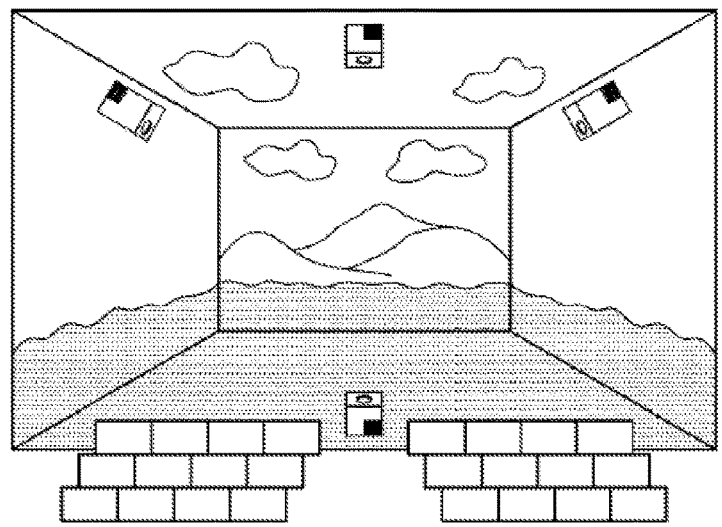
FIG. 5 is a front view showing a multi-projection system in accordance with still another embodiment of the present invention.

This embodiment will be clearly understood with reference to FIGS. 4 and 5. FIG. 4 shows a multi-projection system in accordance with another embodiment of the present invention in which the projection surfaces are arranged on the front, left, right, and upper sides. Therefore, an image is further reproduced on the upper side of the theater, compared to the embodiment shown in FIG. 3, thus displaying the actual reality from various viewpoints. For example, when a movie scene of a fierce storm in the middle of the sea is reproduced by this embodiment, a wavy and windy scene is reproduced on the projection surface arranged on the front, left, and right sides, and a rainy scene is reproduced on the projection surface arranged on the upper side, thus providing the audience with a more realistic image.

FIG. 5 shows a multi-projection system in accordance with still another embodiment of the present invention in which the projection surfaces are arranged on the front, left, right, upper, and lower sides. In this embodiment, the projection surface is further provided on the lower side of the theater, compared to the embodiment shown in FIG. 4. Therefore, the images can be reproduced on all sides within the point of view of the audience. However, when the projection surfaces are arranged as shown in FIG. 5, the position, size, etc. of the projection surface on the lower side should be adjusted such that the image on the lower side can be seen even from the rear seats with respect to the front in view of the position, inclination, etc. of the seats.

In the multi-projection system of the present invention, the number of projection surfaces arranged on each side may be plural. In the embodiment shown in FIG. 5, each single projection surface is provided on the front, left, right, upper, and lower sides. However, the number of projection surfaces arranged on each side is not limited to one, but may be plural. For example, the front may be composed of three sides arranged in a " ⁀ " shape such that the angle formed by the left and right projection surfaces and the front projection surface becomes obtuse, compared to the prior art, thus allowing the images extending from the left side to the front and to the right side to be connected more smoothly. The plurality of projection surfaces may be arranged on the left, right, upper, or lower side in the present invention.

Figure 8:
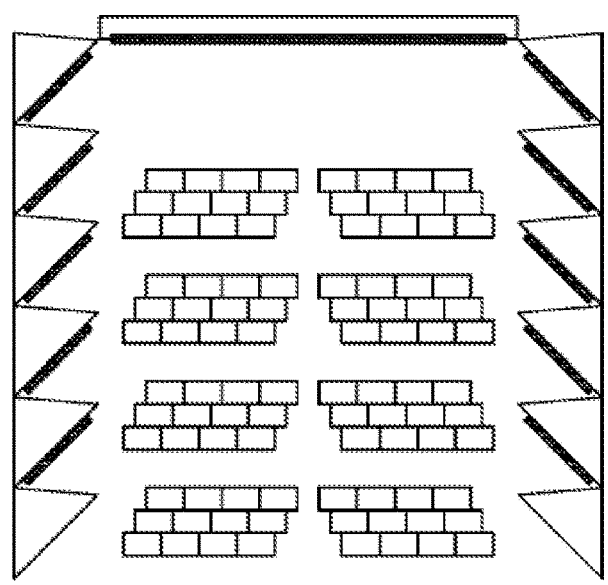
FIG. 8 is a plan view showing a multi-projection system in accordance with yet another embodiment of the present invention.

FIG. 8 is a plan view showing a multi-projection system in accordance with yet another embodiment of the present invention in which the plurality of projection surfaces are arranged on the left and right sides. The embodiment of FIG. 8 shows a structure configured to take maximum advantage of the field of view depending on the position of the audience in the theater such that the audience sitting on the front seat and the audience sitting on the rear seat can enjoy the image having the same three-dimensional effect without being limited to the field of view. The configuration in which the number of projection surfaces arranged on each side is plural is not limited to this embodiment, but includes all possible configurations.

In the multi-projection system of the present invention, the projection surface may be implemented with a screen, an interior surface (e.g., a wall, ceiling, floor, etc.) of the theater, or a surface of an internal fixture (e.g., a sculpture, screening equipment, curtain, panel, etc.) of the theater.

Although the image is projected only on the screen in the conventional theater, the projection surface on which the image is projected is not limited to the screen in the present invention, and the image may also be projected on the interior surface (e.g., a wall, ceiling, floor, etc.) of the theater or the surface of an internal fixture (e.g., a sculpture, screening equipment, curtain, panel, etc.) of the theater.

Moreover, when the plurality of projection surfaces are provided in the theater, all of the projection surfaces need not to be limited to a particular type (e.g., a particular type of screen, a particular type of wall, a particular type of curtain, etc.), and the plurality of projection surfaces may be configured with two or more types of projection surfaces. For example, the plurality of projection surfaces may be configured with (1) different types of screens; (2) different types of interior surfaces of the theater (e.g., walls of different materials, etc.); (3) different types of surfaces of internal fixtures (e.g., a sculpture, screening equipment, curtain, panel, etc.) in the theater; (4) both the projection surface formed with the screen and the projection surfaces formed with the interior surfaces of the theater (e.g. the front projection surface is formed with the screen and the left and right projection surfaces are formed with the walls); (5) both the projection surface formed with the screen and the projection surfaces formed with the surfaces of the internal fixtures of the theater (e.g. the front projection surface is formed with the screen and the left and right projection surfaces are formed with the curtains); (6) both the projection surface formed with the interior surface of the theater and the projection surfaces formed with the surfaces of the internal fixtures of the theater (e.g. the front projection surface is formed with the wall and the left and right projection surfaces are formed with the surfaces of the panels installed in the theater); or (7) all the projection surface formed with the screen, the projection surfaces formed with the interior surfaces of the theater, and the projection surfaces formed with the surfaces of the internal fixtures of the theater (e.g., the front projection surface is formed with the screen, the left and right projection surfaces are the curtains, and the upper and lower projection surfaces are formed with the ceiling and the floor).

Figure 9:
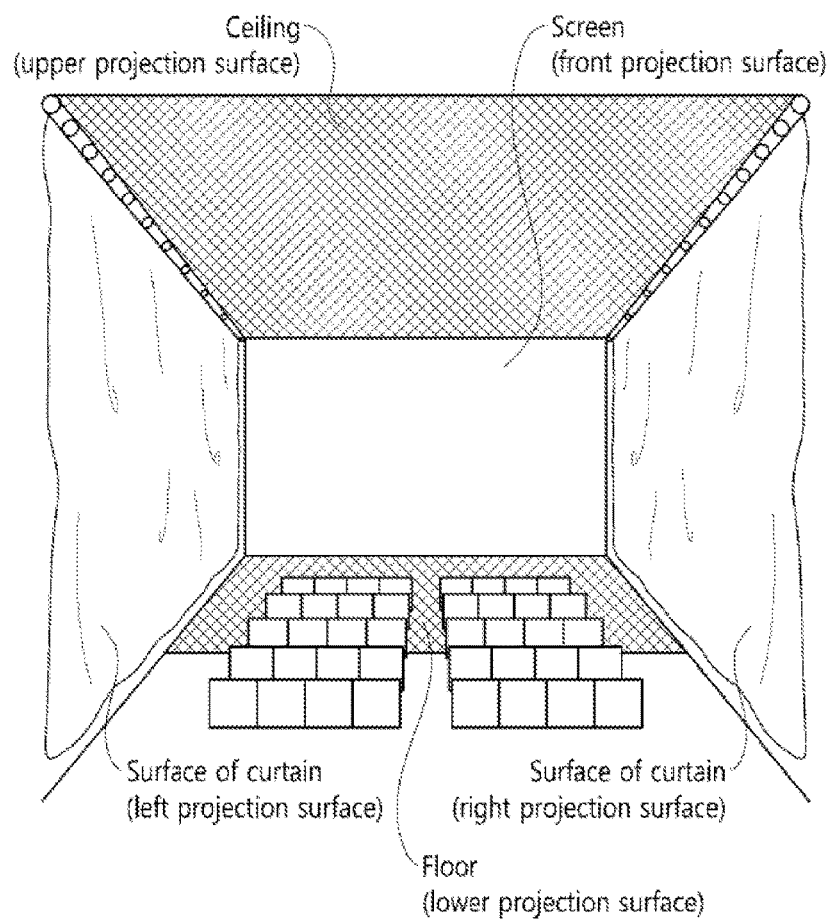
FIG. 9 is a front view showing a multi-projection system in accordance with still yet another embodiment of the present invention.
Figure 10:
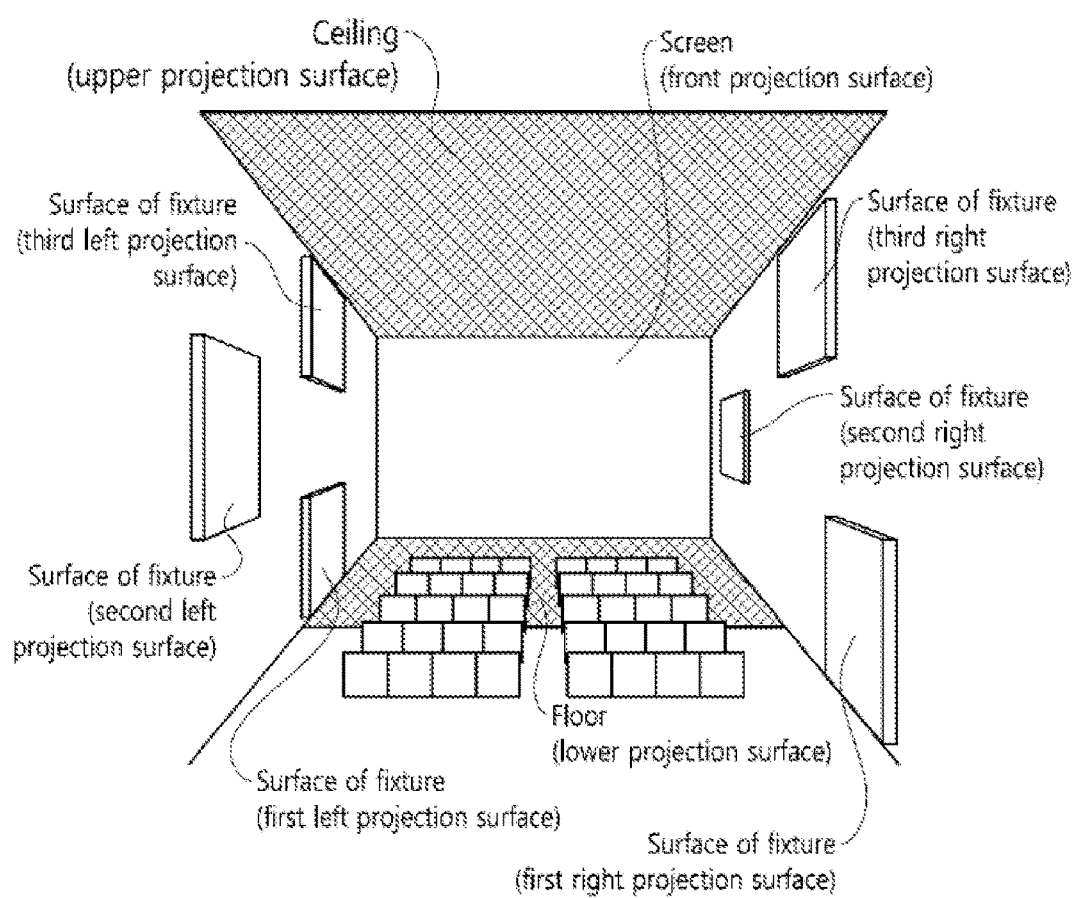
FIG. 10 is a front view showing a multi-projection system in accordance with a further embodiment of the present invention.
Figure 11:
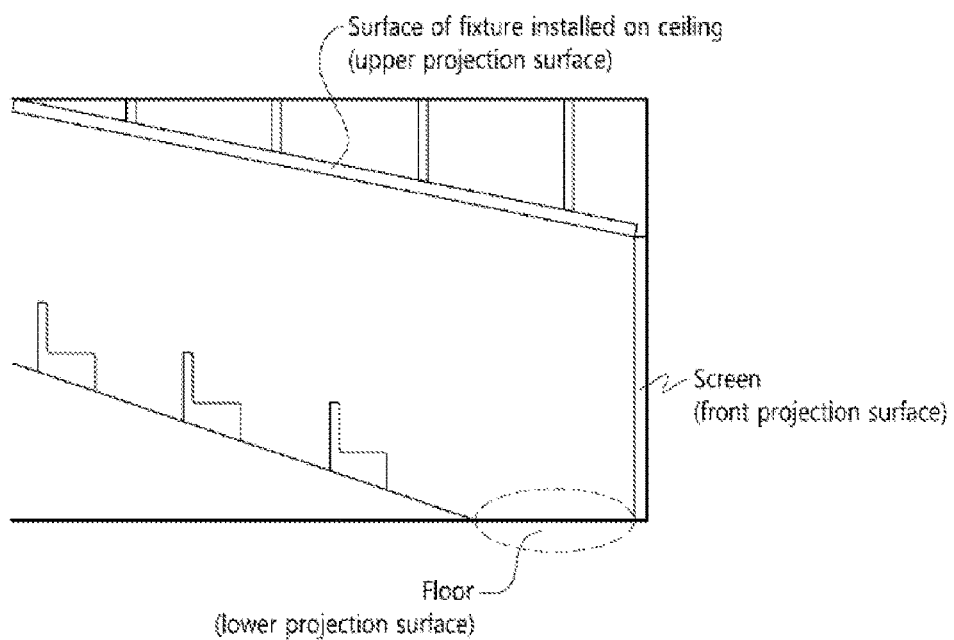
FIG. 11 is a front view showing a multi-projection system in accordance with another further embodiment of the present invention.

Referring to FIG. 9, a multi-projection system in accordance with still yet another embodiment of the present invention is shown in which the front projection surface is formed with a screen, the left and right projection surfaces are formed with curtains (i.e., internal fixtures), and the upper and lower projection surfaces are formed with a ceiling and a floor. Moreover, referring to FIG. 10, a multi-projection system in accordance with a further embodiment of the present invention is shown in which the front projection surface is formed with a screen, the left and right projection surfaces are formed with surfaces of a plurality of sculptures (i.e., internal fixtures), and the upper and lower projection surfaces are formed with a ceiling and a floor. Furthermore, referring to FIG. 11, a multi-projection system in accordance with another further embodiment of the present invention is shown in which the front projection surface is formed with a screen, the upper projection surface is formed with a surface of a panel (i.e., internal fixture), and the lower projection surface is formed with a floor.

Meanwhile, the screen reflects the image projected by a projector, etc. such that the audience can enjoy the image and may have various types that can perform this function (even when the name of a particular component is not the screen, if it can perform the function of reflecting the projected image to the audience, it may fall within the range of the screen).

For example, the screen may be formed of various materials such as a matte screen, a lenticular screen, a glass beaded screen, a silver screen, a high-gain screen, etc.

Moreover, the screen may be of various types such as an embedded electric screen, an exposed electric screen, a wall-mounted screen, a tripod screen, a road warrior screen, a high-brightness screen, a sound screen, etc.

Furthermore, the screen may include a water screen, a fog screen, a holographic screen, a miracle screen (using magic glass), etc. as well as other various types of screens.

In addition, the screen may also be formed of PVC, white-coated PVC, pearl gloss-coated PVC, or aluminum-coated PVC. The type of the screen may be selected depending on the size of each theater, the arrangement of the screen, the properties of the image reproduced on the screen, the resolution of the image, etc. For example, the screen formed of PVC is more suitable for a relatively small theater in terms of the reflectance based on the angle at which the image is projected, whereas, the screen formed of aluminum PVC has an excellent performance of reproducing a digital image or 3D image, compared to other screens.

Moreover, the interior surface of the theater, which can be used as the projection surface in the present invention, may include various interior surfaces having a predetermined surface area, such as a wall, floor, ceiling, aisle, etc. Here, the ceiling and floor are those that constitute a theater, and the wall refers to all sides (such as the front, left, right, and rear sides, connecting surface, etc.) that surround the auditorium, other than the ceiling and floor.

Furthermore, the internal fixture, which can be used as the projection surface in the present invention, may include various objects that are installed in the theater and have a predetermined surface area. For example, the internal fixture may include a sculpture, screening equipment, curtain, panel, etc. as well as other various objects. Also, the internal fixture may be installed on the interior surface, may be spaced apart from the interior surface, or may be singular or plural in number.

Meanwhile, the interior surfaces (e.g., a wall, ceiling, floor, etc.) of the theater or the surfaces of the internal fixtures (e.g., a sculpture, screening equipment, curtain, panel, etc.) of the theater, which are used as the projection surfaces, have optical properties that are inferior to those of the screen, and thus the quality of the images displayed on such surfaces may deteriorate.

Therefore, to improve the quality of the image on the interior surface (e.g., a wall, ceiling, floor, etc.) of the theater or the surface of the internal fixture (e.g., a sculpture, screening equipment, curtain, panel, etc.) of the theater, an optical paint for optical reflection may be applied to the surface on which the image is projected.

Meanwhile, in an embodiment of the present invention, the multi-projection system may include a display means for displaying an image. The display means may be arranged on two or more surfaces which are not in parallel and may comprise an LED or LCD.

In this embodiment, each display means reproduces an image signal transmitted from a main controller, and thus the image can be reproduced in the theater without having to use a separate projector. The arrangement method and arrangement shape of the projection surfaces and the image reproduction method, which have been described in the embodiment including the plurality of projection surfaces, may be applied in the same manner to the multi-projection system including the display means.

In the multi-projection system of the present invention, when the types and properties of the plurality of projection surfaces are different from each other, the color, texture, brightness, etc. of the images reproduced on the respective projection surfaces may vary even when the images projected are the same, and thus the images are not in harmony with each other, resulting in heterogeneity.

Therefore, when the types of the plurality of projection surfaces are different (e.g., when the plurality of projection surfaces are configured with different types of screens, configured with a screen and an interior surface, configured with different types of interior surface, configured with different surfaces of internal fixtures, configured with a screen and a surface of an internal fixture, configured with an interior surface and a surface of an internal fixture, or configured with a screen, an interior surface, and a surface of an internal fixture), it is necessary to correct the images projected on the respective projection surfaces based on the type of each projection surface.

The screens formed of the above-described materials have been optimized for the reproduction of the images, and thus the correction of the images projected on the interior surfaces or the surfaces of the internal fixtures can provide the audience with high-quality images.

First, the color, quality, reflectance, etc. are quite different depending on the type of the projection surface. Even when the images projected are the same, the colors of the reproduced images significantly vary depending on the colors of the projection surfaces, and the textures that the audience feels also vary. Moreover, the brightness of the images varies due to a difference in reflectance. Therefore, it is necessary to correct the images based on the properties of each projection surface.

Figure 6:
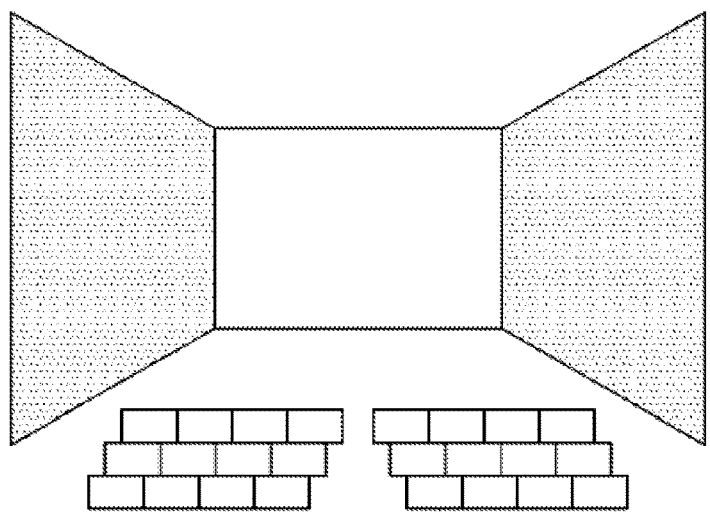
FIGS. 6 and 7 are front views showing a difference in the type of projection surfaces of the multi-projection system according to the present invention.
Figure 7:
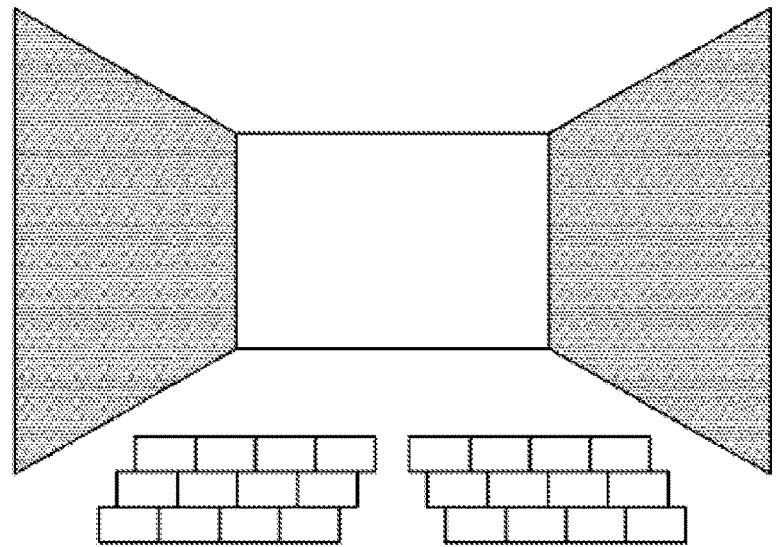

FIGS. 6 and 7 show a multi-projection system in accordance with an embodiment of the present invention, respectively, in which different types of projection surfaces are provided. In the embodiment of FIG. 6, a white screen is used as the front projection surface, while gray walls are used as the left and right projection surfaces.

Although the image projected on the screen can be corrected to have the same color, texture, and brightness as the image projected on the wall, it is more advantageous to correct the image projected on the wall to provide high-quality images.

A gray wall reflects the projected image more darkly than the white screen, and thus it is necessary to correct the image projected on the gray wall based on the fact that the color of the wall is gray. That is, it is necessary to increase the brightness of the projected image by a decrease in brightness due to the gray color.

Meanwhile, the surface of the image on the wall is not smoother than that on the screen. While the screen is a nearly perfect plane, the wall has a gently uneven surface depending on its material. Therefore, even when the images projected are the same, the image projected on a wall having a surface flatness lower than that of the screen allows the audience to get an uneven feel. Thus, when the images are inversely corrected based on the surface flatness of the wall and then projected, the heterogeneity of the images depending on the materials of the projection surfaces can be reduced.

When the images are projected on different types of projection surfaces, the multi-projection system of the present invention projects the images based on a different in reflectance depending on the materials of the projection surfaces.

The reflectance of the wall is lower than that of the screen, and thus the images are projected based on the difference in reflectance. For example, when the projection surfaces are arranged as shown in FIG. 6 (the reflectance ratio of the wall to the screen is 0.5:1), if the intensity of the image projected on the wall is increased by two times the image projected on the screen, it is possible to offset the difference in reflectance depending on the materials of the projection surfaces and reproduce images of the same quality on different types of projection surfaces.

In the multi-projection system in accordance with an embodiment of the present invention, the images are projected based on the type of each projection surface. In the case where the present invention is applied to a conventional theater, the front projection surface has a rectangular shape depending on the aspect ratio of the image, but the side projection surface has various shapes such as a rectangular, parallelogram, or trapezoidal shape, or other various shapes depending on the shape of the theater due to an inclination caused by the arrangement of the seats.

Therefore, the images should be projected based on the type of each projection surface. That is, when an image, which has been adjusted to be projected on a parallelogram projection surface, is projected to a trapezoidal projection surface, a portion of the image may not be displayed on the corresponding projection surface and, on the contrary, the image may not be projected on a portion of the projection surface. The present invention may include the correction of the image based on the type of each projection surface.

As above, although the correction of the image has been described with reference to the screen and wall, the correction based on the difference in properties between the projection surfaces can be, of course, applied (1) between different types of screens; (2) between different types of interior surfaces; (3) between different types of internal fixtures; (4) between a screen and an interior surface; (5) between a screen and an internal fixture; (6) between an interior surface and an internal fixture; and (7) between a screen, an interior surface, and an internal fixture.

Meanwhile, an image projected on a single projection surface may be differently perceived by the audience depending on a distance between the projection surface and a projector that projects the image.

The projector is a kind of a point light source, and thus the distances between the projector and various points in the projection surface are different as long as the projection surface is not a curved surface. When the projector is located in the front of the center of the projection surface, the distance between each apex and the projector is increased compared to the distance between the center of the projection surface and the projector. Since the intensity of light is inversely proportional to the square of the distance, when the distances between the projector and the respective points are different, the intensity of the image projected by one projector varies. As a result, the same color is not clearly visible as the distance between the projection surface and the projector is far away, and the resolution of the image decreases, which is, of course, problematic.

In addition, when the position of the projector that projects the image is not the center of the projection surface, the image from the projector is obliquely projected on the projection surface. As a result, the ratio of the image varies at each point in the projection surface, and thus the size of an object of the same size displayed in the image may differ on the same projection surface, which is also problematic.

Therefore, the multi-projection system of the present invention includes the correction of the image based on the arrangement of the projector, the distance between the projector and each point of the projection surface, and the angle at which the image is projected.

The present invention includes the correction of the image based on various variables that may occur on different types of projection surfaces, in addition to the above variables.

Meanwhile, the above-described image correction may be made by the projector itself or a main controller that controls the projector. Depending on the embodiments, the image can be corrected by the projector itself based on the properties of each projection surface or can be corrected by projecting images on a single projection surface by a combination of a plurality of projectors. Otherwise, an image to be projected on a projection surface can be corrected by the main controller based on the type of the corresponding projection surface, and the corrected image is transmitted to the corresponding projector to be reproduced on the projection surface. In another embodiment, the images can be corrected at the same time by both the main controller and the projector depending on the type of the image correction method (e.g., the correction based on the color of the projection surface, the correction based on the material of the projection surface, the correction based on the reflectance of the projection surface).

FIG. 7 shows an example in which a wall having different properties from those shown in FIG. 6 is used as the projection surface. The description of the image correction applied based on the properties of the projection surface is similar to that of FIG. 6.

Meanwhile, when the projection surface is an interior surface in an embodiment of the present invention, the interior surface comprises a sound absorbing material as one of the characteristic features.

In the case where the multi-projection system of the present invention is applied especially to a multiplex theater in which a plurality of theaters are adjacent to each other, when different types of movies are screened in adjacent theaters, the sounds reproduced in the theaters should not interfere with each other. That is, the sound of a first theater should not be heard by the audience in a second theater.

The interior surface, a type of the projection surface of the present invention, cannot only reproduce the image but also perform the function of effectively insulating the sound produced in each theater. To this end, the interior surface of the present invention comprises a sound absorbing material.

The sound absorbing material may comprise a porous molded sound absorbing material in an embodiment. When the sound propagates through a narrow gap, the porous molded sound absorbing material allows sound energy to be absorbed in the form of thermal energy by friction between the sound and internal elements of the sound absorbing material or by viscosity resistance. Therefore, it is possible to prevent the sound produced in one theater from being transmitted to the other theater.

The sound absorbing material may comprise a plate vibration-type sound absorbing material in another embodiment. According to this embodiment, the rear side of the sound absorbing material included in the interior surface comprises an air layer such that the air layer serves as a kind of damper, thus absorbing sound energy. This embodiment exhibits an excellent effect of absorbing especially low-frequency sound.

The sound absorbing material may comprise a resonance-type sound absorbing material in still another embodiment. This embodiment uses a difference in atmospheric pressure between the inside of the resonance-type sound absorbing material and the theater, and the resonance-type sound absorbing material attenuates sound energy using frictional heat generated when the air in the sound absorbing material vibrates at the resonance frequency.

The above-mentioned absorbing materials in the embodiments cannot only be used alone or in combination thereof. That is, both the porous molded sound absorbing material and the plate vibration-type sound absorbing material can be used at the same time.

Meanwhile, in an embodiment of the present invention, an optical paint for optical reflection may be applied to the interior surface or the interior surface including the sound absorbing material, i.e., the surface on which the image is projected. With the application of the optical paint, the quality of the image projected on the projection surface of the present invention, especially on the interior surface, can be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A multi-projection system, comprising:
a front screen arranged in front of an auditorium;
a first plurality of screens arranged from the left side of the front screen; and
a second plurality of screens arranged from the right side of the front screen,
wherein the first plurality of the screens is spaced apart from each other, and
wherein the second plurality of the screens is spaced apart from each other
wherein the first plurality of the screens are parallel to each other and arranged to have a predetermined angle from the front screen.

2. The multi-projection system of claim 1, wherein the front screen comprises a different material from materials of the first and second plurality of screens.

3. The multi-projection system of claim 1,
wherein the first plurality of screens or the second plurality of screens comprises a Light-Emitting Diode Display (LED) or Liquid Crystal Display (LCD).

* * * * *